United States Patent
Pahlevaninezhad et al.

(10) Patent No.: US 12,455,055 B2
(45) Date of Patent: Oct. 28, 2025

(54) RELIABLE AND SELF-SUFFICIENT LIGHTING SYSTEM AND METHOD THEREFOR

(71) Applicant: 10644137 CANADA INC., Calgary (CA)

(72) Inventors: Majid Pahlevaninezhad, Kingston (CA); Milad Zareie Khabjani, Calgary (CA); Hamid Pahlevaninezhad, Lexington, MA (US)

(73) Assignee: 10644137 CANADA INC., Calgary (CA)

( * ) Notice: Subject to any disclaimer, the term of this patent is extended or adjusted under 35 U.S.C. 154(b) by 0 days.

(21) Appl. No.: 18/879,648

(22) PCT Filed: Aug. 15, 2022

(86) PCT No.: PCT/CA2022/051239
§ 371 (c)(1),
(2) Date: Dec. 27, 2024

(87) PCT Pub. No.: WO2024/000058
PCT Pub. Date: Jan. 4, 2024

(65) Prior Publication Data
US 2025/0224086 A1    Jul. 10, 2025

Related U.S. Application Data

(60) Provisional application No. 63/356,121, filed on Jun. 28, 2022.

(51) Int. Cl.
*F21S 9/02*   (2006.01)
*F21S 9/03*   (2006.01)
(Continued)

(52) U.S. Cl.
CPC ............ *F21S 9/026* (2013.01); *F21S 9/037* (2013.01); *F21V 23/002* (2013.01); *F21V 23/02* (2013.01);
(Continued)

(58) Field of Classification Search
CPC ...... F21S 9/00–046; F21V 23/00–0492; F21Y 2115/10; H05B 47/10–155
See application file for complete search history.

(56) References Cited

U.S. PATENT DOCUMENTS 8,106,593 B2 *   1/2012   Nevins ................... H02S 40/38
                                                                    315/159

FOREIGN PATENT DOCUMENTS

CN        215259517 U    12/2021
FR        2922628 B1      7/2013
(Continued)

OTHER PUBLICATIONS

International Search Report issued in International Application No. PCT/CA2022/051239 dated Mar. 12, 2023 (5 pages).
(Continued)

*Primary Examiner* — Jason M Han
(74) *Attorney, Agent, or Firm* — Osha Bergman Watanabe & Burton LLP

(57) ABSTRACT

A lighting apparatus has a lighting component, an energy storage unit, a photovoltaic (PV) panel for at least one of powering the lighting component and charging the energy storage unit, a wind turbine having a plurality of rotatable blades coupled to a generator for at least one of powering the lighting component and charging the energy storage unit, and a housing receiving therein at least the lighting component, the energy storage unit, and the PV panel. The wind turbine is physically coupled to the housing.

20 Claims, 15 Drawing Sheets

(51) Int. Cl.
  *F21V 23/00* (2015.01)
  *F21V 23/02* (2006.01)
  *F21V 23/04* (2006.01)
  *F21Y 115/10* (2016.01)
  *H05B 47/11* (2020.01)
  *H05B 47/155* (2020.01)

(52) U.S. Cl.
  CPC .......... *F21V 23/0464* (2013.01); *H05B 47/11* (2020.01); *H05B 47/155* (2020.01); *F21Y 2115/10* (2016.08)

(56) References Cited

FOREIGN PATENT DOCUMENTS

| | | |
|---|---|---|
| KR | 100923509 B1 | 10/2009 |
| KR | 101476709 B1 | 12/2014 |
| WO | 2021/089553 A1 | 5/2021 |

OTHER PUBLICATIONS

Written Opinion issued in International Application No. PCT/CA2022/051239 dated Mar. 12, 2023 (7 pages).

* cited by examiner

RELIABLE AND SELF-SUFFICIENT LIGHTING SYSTEM AND METHOD THEREFOR

CROSS-REFERENCE TO RELATED APPLICATIONS

This application claims the benefit of U.S. Provisional Patent Application Ser. No. 63/356,121, filed Jun. 28, 2022, the content of which is incorporated herein by reference in its entirety.

FIELD OF THE DISCLOSURE

The present disclosure relates to lighting apparatuses and systems, and in particular to Light-Emitting Diode (LED) apparatuses and systems with power converter, and methods of controlling and powering the LEDs thereof.

BACKGROUND

Light-Emitting Diodes (LEDs) are known and have been widely used in industries, mostly used as low-power light indicators. In recent years, LEDs with increased power output or increased luminous intensity have been developed and used for illumination. For example, LED lights provide improved energy efficiency, safety, and reliability, and are replacing other types of lights in the market, such as incandescent lights, Compact Fluorescent Lamps (CFLs), and the like. As everyday lighting significantly contributes to the burden on power grids and greatly increases the overall requirements for electricity generation, the energy efficiency of LEDs will play a crucial role in future energy savings. It is likely that LEDs will dominate the lighting markets because of their superior energy efficiency.

High efficient LEDs have been replacing the conventional lighting solutions for street lights. Thus, LED street light is a fast-growing industry due to various advantages, such as high intensity, high efficiency, high reliability, and/or the like. Also, LED street lights need to be able to operate outdoor during harsh weather conditions for a long time. Thus, their reliability and robustness are of great importance.

In order to reduce the electricity consumption of street lights and make them more "green", the integration of renewable energy systems as well as energy storage systems have been used. For example, a solar or photovoltaic (PV) panel is often used to harvest solar energy and a battery is employed to provide storage capability. During the daytime, the battery stores the solar energy harvested by the PV panel and at nighttime the battery provides energy for the LED light.

FIG. 1 is a schematic diagram showing a prior-art LED street-light system 10 having a PV panel 12 and a battery 14. As shown, the LED street-light system 10 comprises a LED light 16 installed on a post 18. The LED light 16 is connected to the battery 14, usually through a power converter (not shown). The PV panel 12 is also connected to the battery 14 for charging the battery 14 during daytime. The LED street-light system 10 may also comprise an Alternate Current (AC) power input such as an AC utility power grid (not shown) for powering the LED light 16.

The battery 14 requires low temperature variations. Moreover, due to its heavy weight, the battery 14 is usually placed on or underground. However, such an arrangement requires long wiring between the battery 14 and the LED light 16, and between the battery 14 and the PV panel 12. The long wiring may cause increased electrical resistance and increased waste of power consumption by the long wiring. Such an issue is particularly significant for high-power LED lights such as lights for highways because of their low battery voltage and high current.

FIG. 2 is a block diagram of the prior-art LED street-light system 10 shown in FIG. 1. As shown, the LED street-light system 10 comprises a plurality of power converters. In particular, a first Direct-Current (DC) to Direct-Current converter (DC/DC converter) 24 converts the output of the PV panel 12 to a DC power suitable for charging the battery 14. The first DC/DC converter 24 may use maximum power point tracking (MPPT) for harvesting maximum available power from the PV panel 12 under applicable conditions.

The battery 14 is connected to the LED street light 16 via a second DC/DC converter 26. The second DC/DC converter 26 converts the DC output of the battery 26 to a voltage/current suitable for the LEDs 16.

The LED street light 16 is also powered by an AC power source 22 via an AC-to-DC (AC/DC) converter 28 in case there is not enough energy stored in the battery 14.

There are various challenges and difficulties related to the prior-art LED street-light systems. For example,
- the long wiring between the battery 14 and other components such as the LED lights 16 and the PV panel 12 causes significant power loss. Thus, the overall energy efficiency of the street-light system is usually poor;
- the system requires a plurality of power converters such as the power converters 24, 26 and 28 shown in FIG. 2, thereby causing increased system complexity, increased cost, and reduced reliability; and
- a utility power grid 22 is required for powering the system when the battery 14 does not have enough stored energy, thereby causing energy-demand burdens to the utility power grid 22.

Due to the aforementioned challenges, the existing LED street light may not provide an optimal lighting solution. Due to the exponential growth of street lights and their impact on the utility power grid system, sub-optimal operation has a significant and adverse impact on the power system.

SUMMARY

According to one aspect of this disclosure, there is provided a lighting apparatus comprising: a lighting component; an energy storage unit; a photovoltaic (PV) panel for at least one of powering the lighting component and charging the energy storage unit; a wind turbine having a plurality of rotatable blades coupled to a generator for at least one of powering the lighting component and charging the energy storage unit; and a housing receiving therein at least the lighting component, the energy storage unit, and the PV panel; the wind turbine is physically coupled to the housing.

In some embodiments, the lighting component is a light-emitting diode (LED).

In some embodiments, the lighting apparatus further comprises a reflector coupled to the housing for reflecting light towards the PV panel.

In some embodiments, the wind turbine comprises a gyroscopic structure; and the plurality of rotatable blades are coupled to the gyroscopic structure for aligning a direction of the plurality of rotatable blades along a wind direction.

In some embodiments, the gyroscopic structure comprises: an outer frame coupled to a support and rotatable about a first axis; and an inner frame coupled to the outer frame and rotatable about a second axis perpendicular to the first axis; the plurality of rotatable blades are coupled to the inner frame.

In some embodiments, the inner frame comprises a wind diffuser structure receiving therein the plurality of rotatable blades.

In some embodiments, the wind diffuser structure has a conical shape.

In some embodiments, the gyroscopic structure comprises a coupling structure supporting the generator; the outer frame comprises a plurality of electrically conductive portions separated by a pair of electrical isolators; the coupling structure is coupled to and extends between the plurality of conductive portions; and each of the conductive portions is electrically connected to the generator via a first electrical wiring of the coupling structure for receiving electricity from the generator, and is also electrically connected to a second electrical wiring of the support for outputting the electricity received from the generator.

In some embodiments, the coupling structure comprises a plurality of electrically conductive first arms for acting as the first electrical wirings; and the support comprises a plurality of electrically conductive second arms for acting as the second electrical wirings.

In some embodiments, the gyroscopic structure comprises an aligning tail for tracking the wind direction.

In some embodiments, the energy storage unit comprises an energy-storage capacitor.

In some embodiments, the energy storage unit comprises an energy-storage capacitor.

In some embodiments, the energy-storage capacitor comprises a least one capacitor cell.

In some embodiments, the energy-storage capacitor comprises a plurality of stacked capacitor cells.

In some embodiments, each capacitor comprises a plurality of stacked layers of: a dielectric membrane; and two conductive layers of two-dimensional (2D) or three-dimensional (3D) materials sandwiching the dielectric membrane; the plurality of stacked layers extend along a rear side of the PV panel without wrapping.

In some embodiments, the 2D or 3D materials comprise graphene and/or graphite.

In some embodiments, the lighting apparatus further comprises a thermoelectric unit received in the housing, the thermoelectric unit coupled to the lighting component or the PV panel for converting heat emitted therefrom to electricity for at least one of powering the lighting component and charging the energy storage unit.

In some embodiments, the thermoelectric unit comprises: a first thermal-conductive plate coupled to the lighting component or the PV panel; a second thermal-conductive plate; and a thermoelectric layer sandwiched between the first and second thermal-conductive plates.

In some embodiments, the thermoelectric layer comprises 2D perovskite.

In some embodiments, the thermoelectric layer comprises a plurality of thermoelectric sublayer extending between the first and second thermal-conductive plates, each adjacent pair of thermoelectric sublayers sandwiching therebetween a membrane.

In some embodiments, the lighting apparatus further comprises one or more sensors.

In some embodiments, the one or more sensors comprises at least one of one or more light sensors, one or more temperature sensors, one or more humidity sensors, and one or more motion sensors.

In some embodiments, the lighting apparatus further comprises a power circuit electrically coupled to the lighting component, the energy storage unit, the PV panel, the wind turbine, and the one or more sensors; and a supervisory control module electrically coupled to the power circuit for adjusting operation of the lighting apparatus based on output of the one or more sensors.

In some embodiments, the supervisory control module comprises one or more artificial intelligence (AI) models for predicting operation conditions of the lighting apparatus based on the output of the one or more sensors for adjusting the operation of the lighting apparatus.

According to one aspect of this disclosure, there is provided a lighting system comprising a plurality of above-described lighting apparatuses; each of the plurality of lighting apparatuses further comprises a communication component; and the lighting system is configured for coordinating the operation of the plurality of lighting apparatuses based on the output of the one or more sensors of the plurality of lighting apparatuses.

In some embodiments, the lighting system is configured for: predicting the operation conditions of the plurality of lighting apparatuses using the one or more AI models based on the output of the one or more sensors of the plurality of lighting apparatuses; and coordinating the operation of the plurality of lighting apparatuses based on the predicted operation conditions of the plurality of lighting apparatuses.

BRIEF DESCRIPTION OF THE DRAWINGS

For a more complete understanding of the disclosure, reference is made to the following description and accompanying drawings, in which.

DETAILED DESCRIPTION

The present disclosure generally relates to lighting apparatuses and/or systems such as Light-Emitting Diode (LED) apparatuses and systems. In some embodiments, the lighting apparatus may be a LED street light. The lighting apparatus disclosed herein comprises various energy-conversion units, electronics, sensors such as light sensors, temperature sensors, humidity sensors, motion sensors, and/or the like, lighting components such as LEDs, mechanical enclosure, and/or the like. The lighting apparatus is reliable and self-sufficient and may provide power for the lighting components in an efficient manner without a need for the utility power grid.

Figure 1:
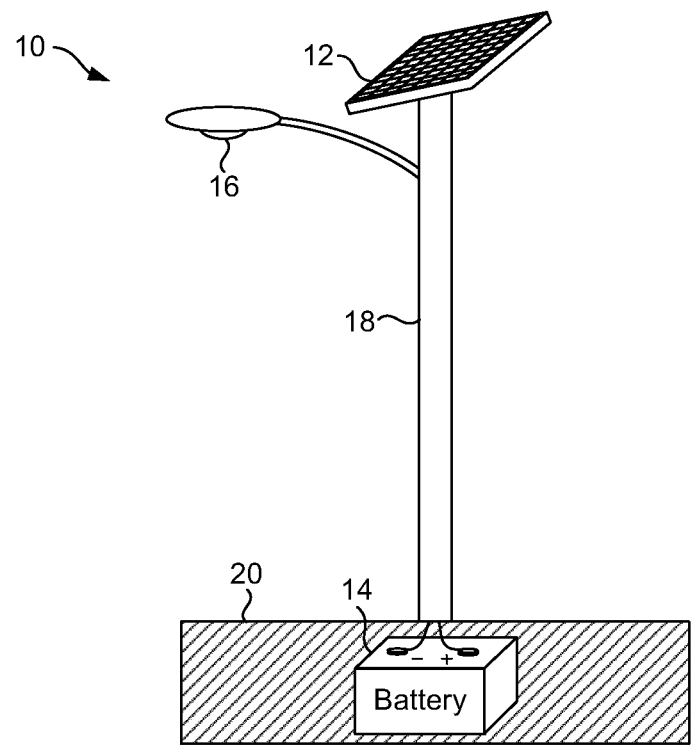
FIG. 1 is a schematic diagram of a prior-art street-light system having a solar panel and a battery assembly.
Figure 2:
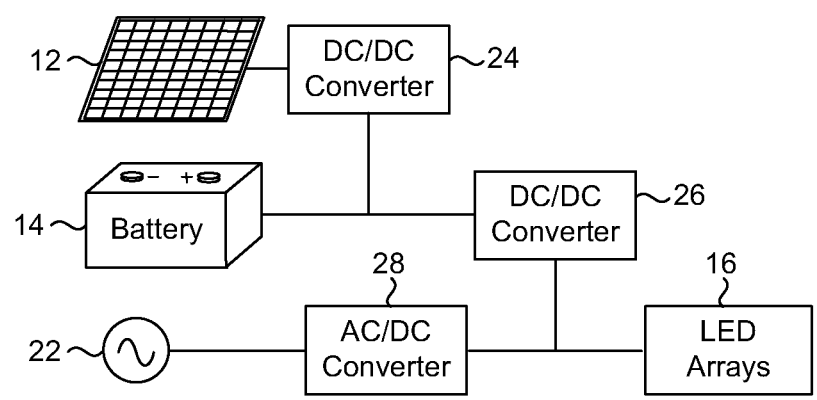
FIG. 2 is a block diagram of the prior-art LED street-light system shown in FIG. 1.
Figure 3:
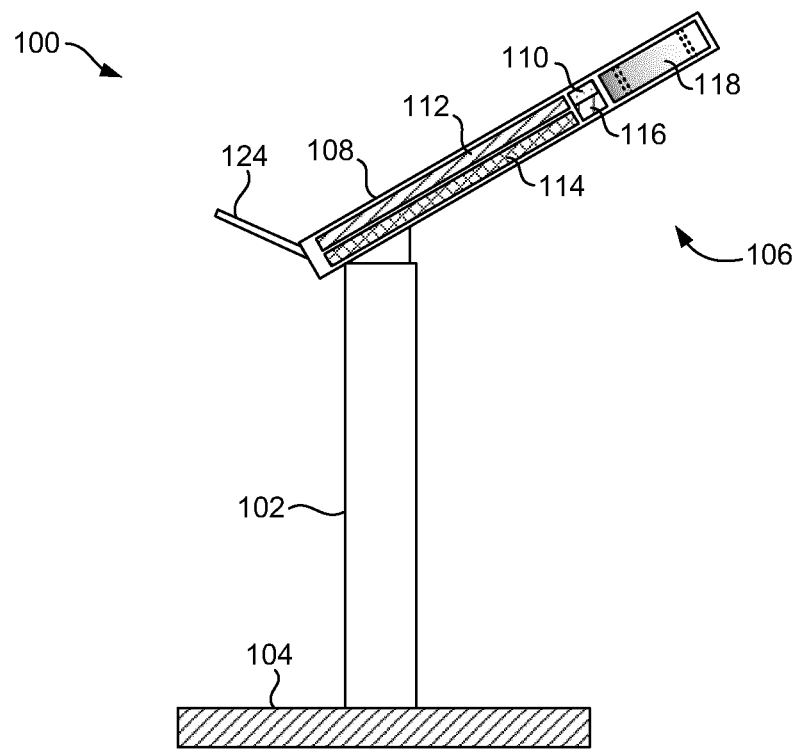
FIG. 3 is a schematic cross-sectional view of a lighting apparatus, according to some embodiments of this disclosure.
Figure 4:
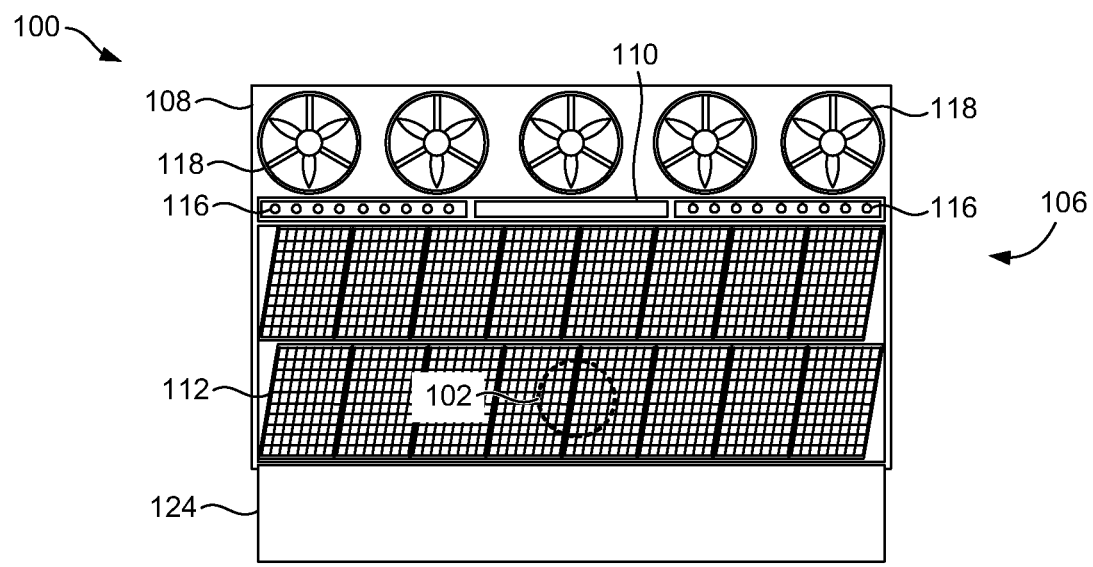
FIG. 4 is a schematic plan view of the lighting apparatus shown in FIG. 3.
Figure 5:
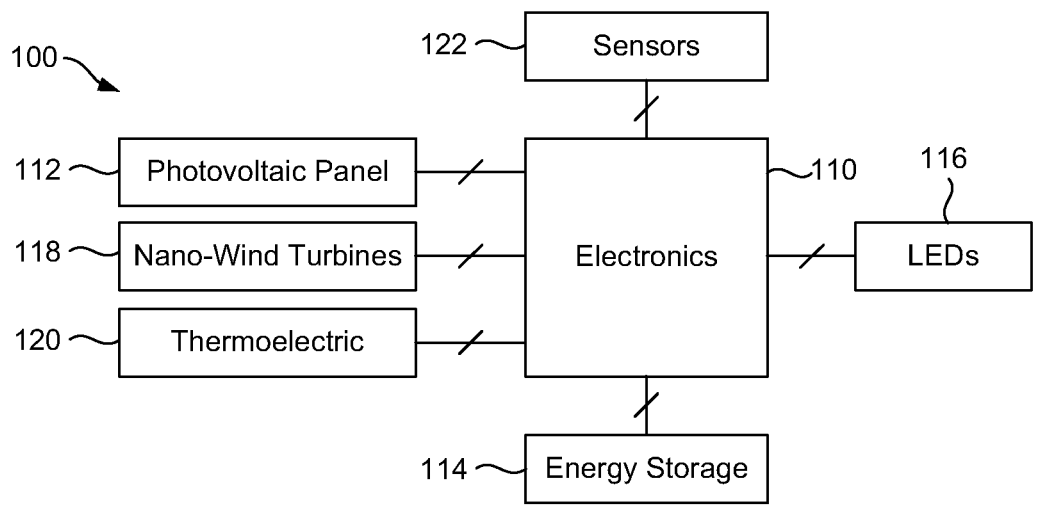
FIG. 5 is a block diagram showing the functional structure of the lighting apparatus shown in FIG. 3.

Turning now to FIGS. 3 to 5, a self-sufficient lighting apparatus is shown and is generally identified using reference numeral 100, according to some embodiments of this disclosure, wherein FIG. 3 is a schematic cross-sectional view of the lighting apparatus 100, FIG. 4 is a schematic plan view thereof, and FIG. 5 is a block diagram showing the components thereof. As shown, the lighting apparatus 100 comprises a supporting structure 102 such as a pole extending upwardly from the ground 104 and supporting a lighting assembly 106 thereabove.

The lighting assembly 106 comprises a housing or enclosure 108 receiving therein an electronic circuitry 110, one or more photovoltaic (PV) panels 112, one or more energy storage units 114, one or more lighting components 116 such as one or more LEDs, one or more wind turbines 118 which in these embodiments are small-scale wind turbines (also denoted "nano-wind turbines" hereinafter), and other components and circuits such as one or more thermoelectric units 120 (also denoted "thermoelectric generators (TEGs)") and one or more sensors 122. In these embodiments, the lighting assembly 106 also comprises one or more reflectors 124 coupled to the housing 108 at a suitable angle for reflecting sunlight towards the PV panels 112.

By integrating the components 110 to 122 into the housing 108, the lighting assembly 106 does not require any external wiring, thereby providing ease of deployment and energy savings that may otherwise waste on the external wiring).

In these embodiments, the PV panels 112 are connected to the energy storage units 114 for converting solar energy to electrical energy in daytime and storing the converted electrical energy into the energy storage units 114. The nano-wind turbines 118 are connected to the energy storage units 114 for converting wind energy to electrical energy and storing the converted electrical energy into the energy storage units 114. In some embodiments, the PV panels 112 and/or the nano-wind turbines 118 are also connected to the LEDs 116 for powering the LEDs 116 for lighting. The electronic circuitry 110 controls the operation of the components 112 to 122.

Figure 6:
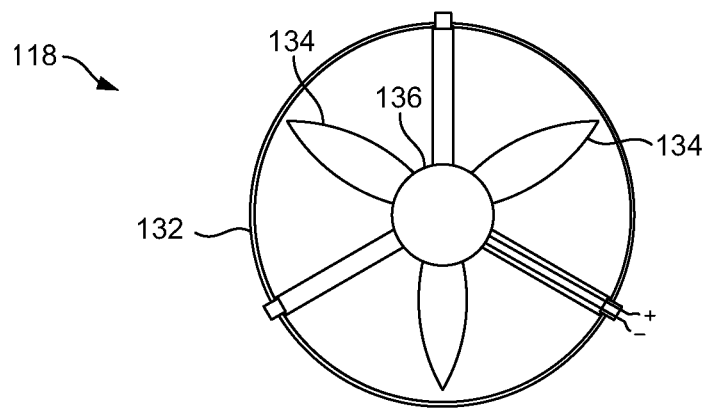
FIG. 6 is a schematic plan view of a wind turbine of the lighting apparatus shown in FIG. 3, according to some embodiments of this disclosure.
Figure 7:
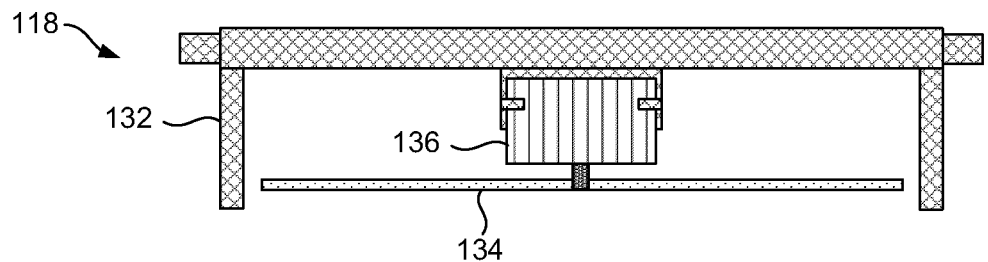
FIG. 7 is a schematic cross-sectional view of the wind turbine shown in FIG. 6.

FIGS. 6 and 7 are schematic plan view and cross-sectional view, respectively of the nano-wind turbine 118. As shown, the nano-wind turbine 118 comprises a frame structure 132 supporting a set of blades 134 rotatable therein. The blades 134 are coupled to a generator 136 for driving the generator 136 to convert wind energy to electrical energy.

Figure 8:
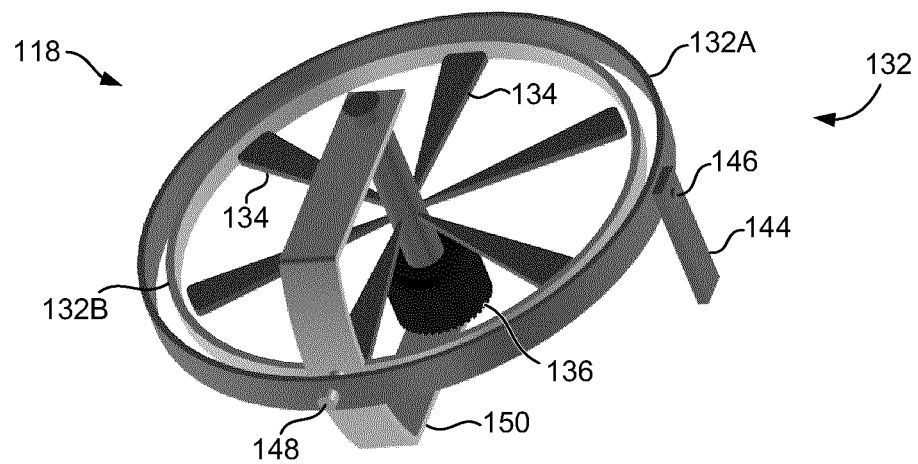
FIG. 8 is a schematic perspective view of a wind turbine of the lighting apparatus shown in FIG. 3, according to some other embodiments of this disclosure.
Figure 9:
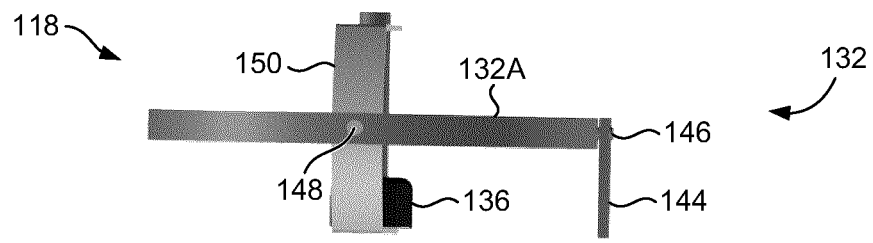
FIG. 9 is a schematic side view of the wind turbine shown in FIG. 8.
Figure 10:
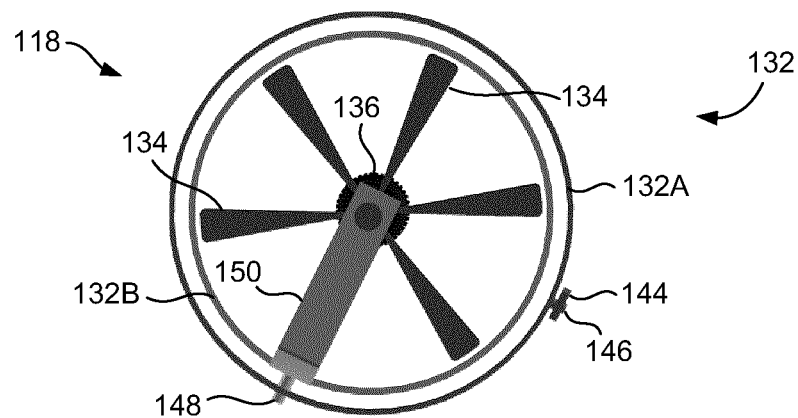
FIG. 10 is a schematic plan view of the wind turbine shown in FIG. 8.

In some embodiments, the frame structure 132 of the nano-wind turbine 118 comprises a gyroscopic structure for harvesting the maximum amount of wind energy for converting to electricity. As shown in FIGS. 8 to 10, the frame structure 132 comprises an outer frame 132A and an inner frame 132B both in suitable shapes such as circular shapes. The outer frame 132A is rotatably mounted or otherwise coupled to a support 144 for rotating about a first axis 146. The inner frame 132B is rotatably mounted or otherwise coupled to the outer frame 132A for rotating about a second axis 148 substantially perpendicular to the first axis 146. The blades 134 are rotatably coupled to the inner frame 132B via a coupling structure 150. As described above, the blades 134 are also coupled to the generator 136 for driving the generator 136 to convert wind energy to electrical energy.

By using the gyroscopic structure 132, the blades 134 may be rotated about the axes 146 and 148 under the wind pressure applied thereon to align to the wind direction for harvesting the maximum amount of wind energy.

Figure 11:
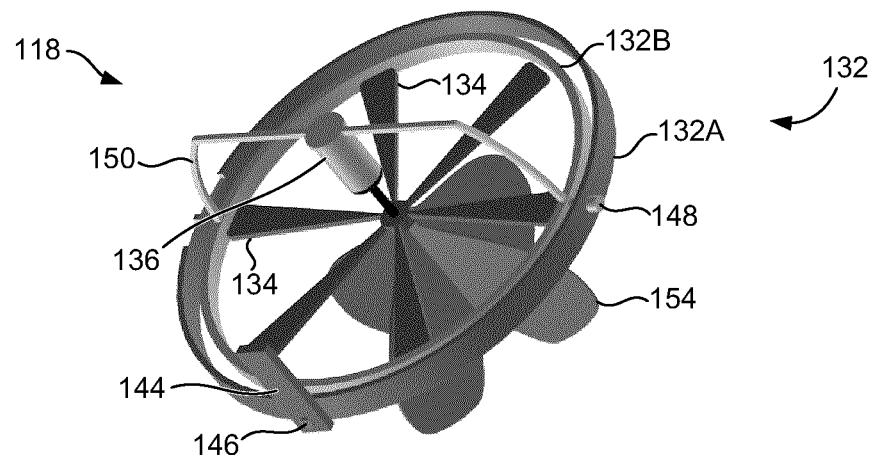
FIG. 11 is a schematic perspective view of a wind turbine of the lighting apparatus shown in FIG. 3, according to yet some other embodiments of this disclosure.
Figure 12:
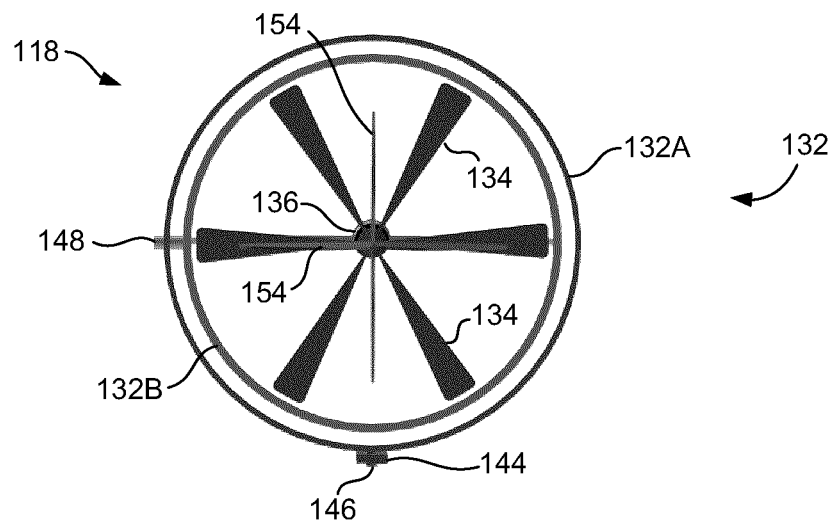
FIG. 12 is a schematic bottom view of the wind turbine shown in FIG. 11.
Figure 13:
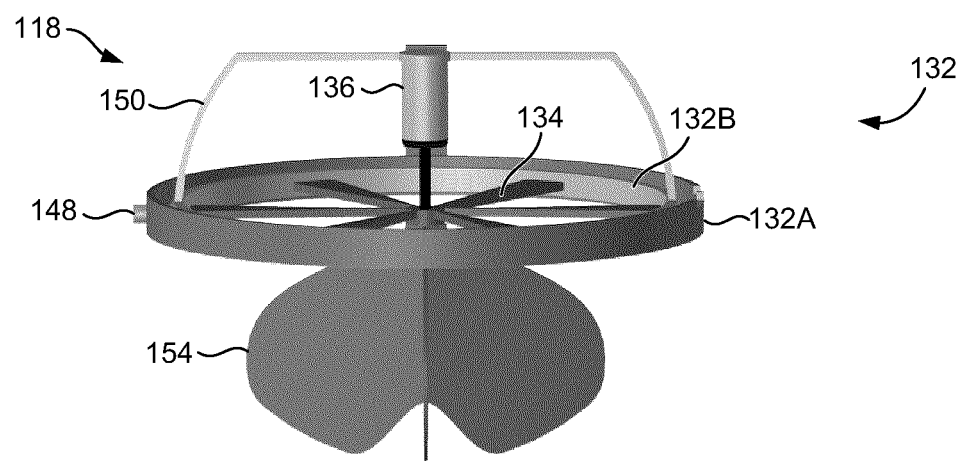
FIG. 13 is a schematic side view of the wind turbine shown in FIG. 11.

FIGS. 11 to 13 show a nano-wind turbine 118 according to some embodiments of this disclosure. The nano-wind turbine 118 is similar to that shown in FIGS. 8 to 10 and further comprises an aligning tail 154 to ensure that the wind direction is tracked by the gyroscopic structure 132.

The energy storage units 114 store the energy harvested by the PV panels 112 and the nano-wind turbines 118, and power the LEDs 116 when needed (for example, when sunlight is not available). The energy storage units 114 may be any suitable energy storage components such as one or more batteries (such as high-density Lithium-Ion (LI) batteries), one or more so-called super-capacitors (which are energy-storage capacitors of large energy-storage capacities), and/or the like.

In some embodiments, the large area provided by the PV panels 112 may be suitable for coupling super-capacitors thereto with electrical connection for using the super-capacitors as the energy storage units 114.

Figure 14:
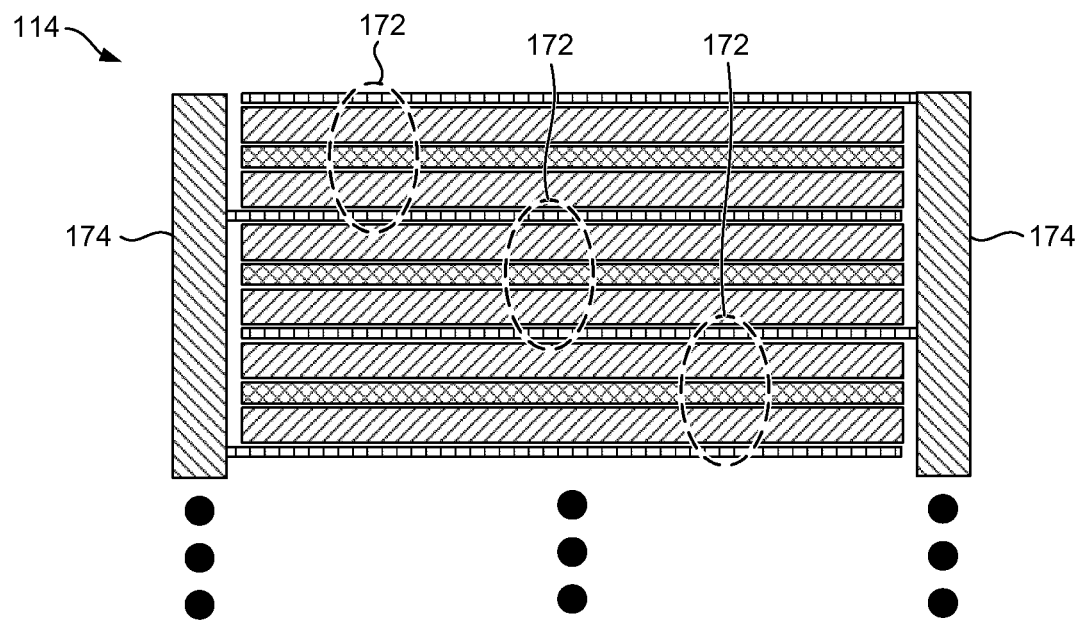
FIG. 14 is a schematic diagram showing the structure of a thin-film super-capacitor of the lighting apparatus shown in FIG. 3 having a plurality of capacitor cells, according to some embodiments of this disclosure.
Figure 15:
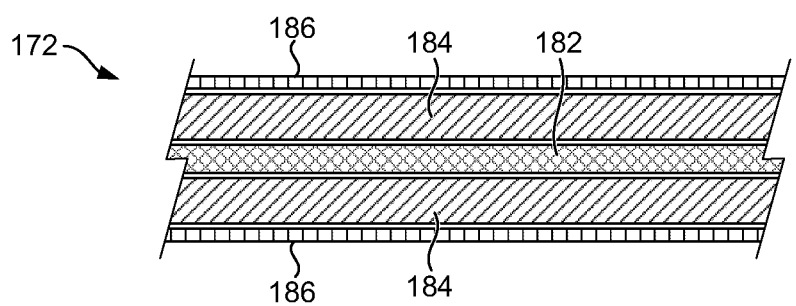
FIG. 15 is a schematic diagram showing the structure of a capacitor cell of the thin-film super-capacitor shown in FIG. 14.

FIGS. 14 and 15 show the structure of a thin-film super-capacitor 114 for effectively storing energy for the lighting apparatus 100. As shown in FIG. 14, the super-capacitor 114 comprises one or more capacitor cells 172 connected to a pair of conductors or electrodes 174. As shown in FIG. 15, each capacitor cell 172 comprises a plurality of stacked layers including a dielectric membrane 182 sandwiched between two layers of conductive two-dimensional (2D) or three-dimensional (3D) materials 184 such as graphene, graphite, and/or the like. Each layer 184 is electrically coupled to a conductor 186 on the outer side thereof. By using the 2D or 3D material layers 184, the capacitor cell 172 may be made very thin with a very large area. When a plurality of capacitor cells 172 are stacked and integrated to form the thin-film super-capacitor 114, the adjacent 2D or 3D material layers 184 of two capacitor cells 172 may share a same conductor 186, as shown in FIG. 14. As those skilled in the art will appreciate, the thin-film super-capacitor 114 provides several advantages such as:

- much faster dynamic behavior of the thin-film super-capacitor 114 compared to that of batteries, which is important for performance lighting applications due to the erratic nature of the energy sources;
- much longer lifetime of the thin-film super-capacitor 114 compared to that of batteries because, unlike batteries, the thin-film super-capacitor 114 generally does not experience electrochemical reactions, and thus the lifespan of the thin-film super-capacitor 114 may be extended to many years with minimal performance degradation; and
- a wide operational temperature range of the thin-film super-capacitor 114, which makes it particularly suitable for outdoor applications.

Moreover, the thin-film super-capacitor 114 may extend along a rear surface of the PV panel 112 without the need of wrapping the stacked layers thereof. Such a layout efficiently leverages the large area of the PV panel 112 and reduces the thickness of the thin-film super-capacitor 114.

Figure 16:
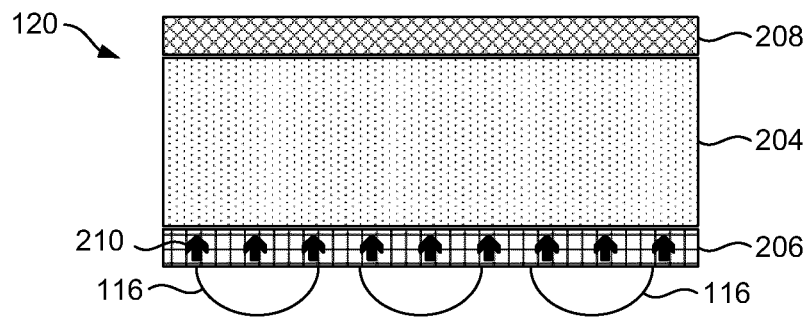
FIG. 16 is a schematic diagram showing a thermoelectric generator (TEG) coupled to lighting components of the lighting apparatus shown in FIG. 3 for converting the temperature gradient to electricity, according to some embodiments of this disclosure.
Figure 17:
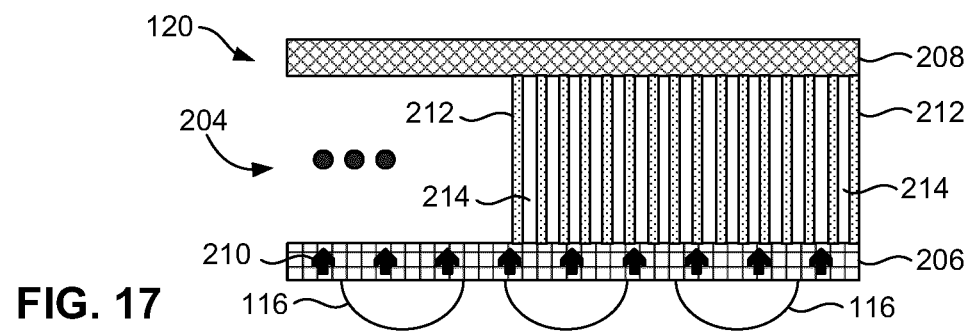
FIG. 17 is a schematic diagram showing the structure of the TEG of the lighting apparatus shown in FIG. 3, according to some embodiments of this disclosure.

FIGS. 16 and 17 show the structure of the TEG 120 for converting the temperature gradient to electricity.

As shown, the TEG 120 comprises a thermoelectric layer 204 (such as such as a layer of 2D perovskite) sandwiched between a pair of thermal-conductive plates 206 and 208 (denoted a "hot plate" and a "cold plate", respectively, hereinafter). The hot plate 206 is positioned adjacent a heat source such as the LEDs 116 (for example, directly coupled to the circuit board of the LEDs 116 or coupled to the circuit board of the lighting components 116 via the metal housing 108), and acts as a heat sink for directly heat 210 from the LEDs 116 towards the thermoelectric layer 204. The cold plate 208 is positioned away from the LEDs 116 to maintain a temperature difference from the hot plate 206.

Figure 18:
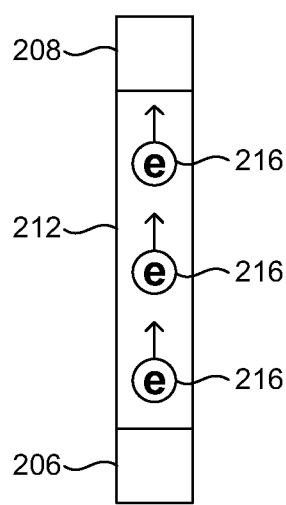
FIG. 18 is a schematic diagram of the TEG shown in FIG. 17, illustrating the movement of electrons.

As shown in FIG. 17, in some embodiments, the thermoelectric layer 204 comprises a plurality of thermoelectric sublayer 212 extending between the hot plate 206 and cold plate 208. Each adjacent pair of thermoelectric sublayers 212 sandwiching therebetween a membrane 214. Each thermoelectric sublayer 212 comprises a thermoelectric material, such as 2D perovskite, that has good electron conductivity and poor heat conductivity (in other words, electrically conductive and thermally insulating), so as to trap the heat 210 emitted from the LEDs 116 close to the hot plate 206 and, as shown in FIG. 18, create enough energy to drive electrons 216 to the cold plate 208, thereby converting temperature gradient between the hot plate 206 and cold plate 208 to electrical current.

The TEG 120 provides great redundancy for the lighting apparatus 100 and may effectively recycle some of the energy produced by the LEDs 116 as heat. In a high-power lighting apparatus 100, the LEDs 116 may produce a significant amount of heat, which makes the heatsink or hot plate 206 at a high temperature. Thus, there is a significant temperature gradient between the hot and cold plates 206 and 208 for generating electricity.

In some embodiments, the thermal energy produced by other components of the lighting apparatus 100 may also be recycled by using the TEG 120. For example, the PV panels 112 are exposed to direct sunlight, which leads to an increase in their temperature. Higher temperature tends to reduce the efficiency of the PV panels 112.

Figure 19:
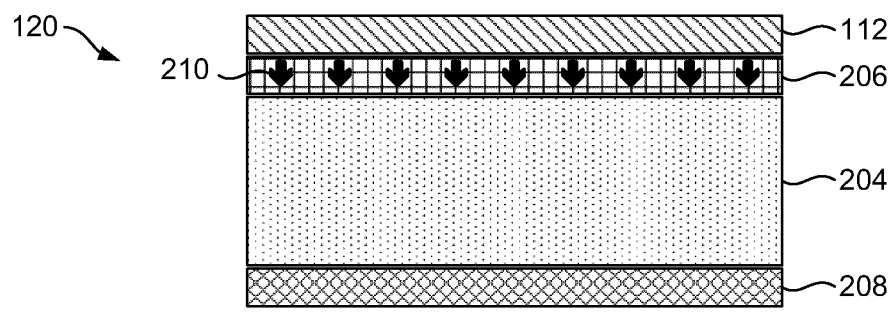
FIG. 19 is a schematic diagram showing the TEG coupled to a photovoltaic (PV) panel of the lighting apparatus shown in FIG. 3, according to some embodiments of this disclosure.
Figure 20:
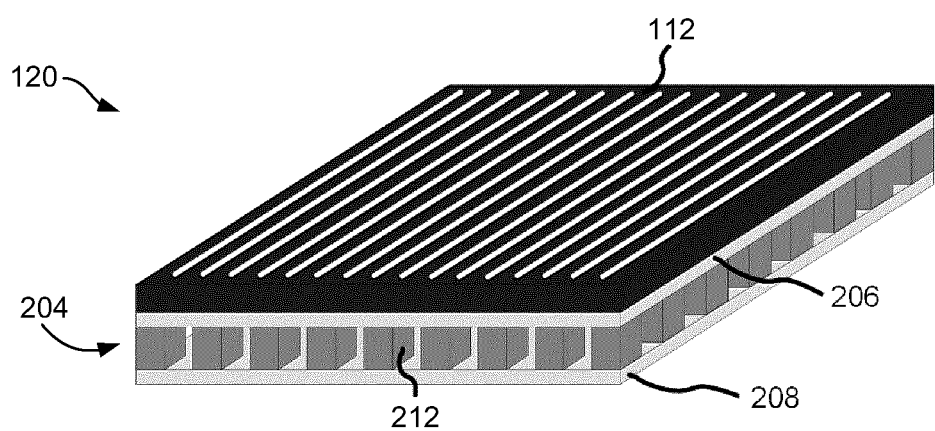
FIG. 20 is a schematic perspective view of the TEG and the PV panel shown in FIG. 19.

As shown in FIGS. 19 and 20, in some embodiments, one or more TEGs 120 may be coupled to the rear side of the PV panels 112 for converting heat generated by the PV panels 112 to electricity, which, at the same time, also helps cool down the PV panels 112 thereby leading to an increased PV panel efficiency.

The one or more sensors 122 may be one or more light sensors, one or more temperature sensors, one or more humidity sensors, one or more motion sensors, and/or the like for sensing the environment of the lighting apparatus 100. The electronic circuitry 110 uses the outputs of the sensors 122 for controlling the operation of the lighting apparatus 100. For example, a light sensor may be used to sense the ambient light intensity which may be used for turning on the LEDs 116 (for example, in daytime) or turning off the LEDs 116 (for example, at night). A motion sensor may be used to turn on and off the LEDs 116 (for example, turning the LEDs 116 on when a moving object is detected by the motion sensor, or turning the LEDs 116 off when no moving object is detected by the motion sensor for a predefined time period).

Thus, the lighting apparatus 100 uses three different energy sources, namely, the PV panels 112, the nano-wind turbines 118, and the TEGs 120 for storing electricity in the energy storage units 114 and/or powering the LEDs 116. Using three different energy sources provide great flexibility and redundancy to the lighting apparatus 100. Thus, the reliability of the lighting apparatus 100 may be significantly increased.

Figure 21:
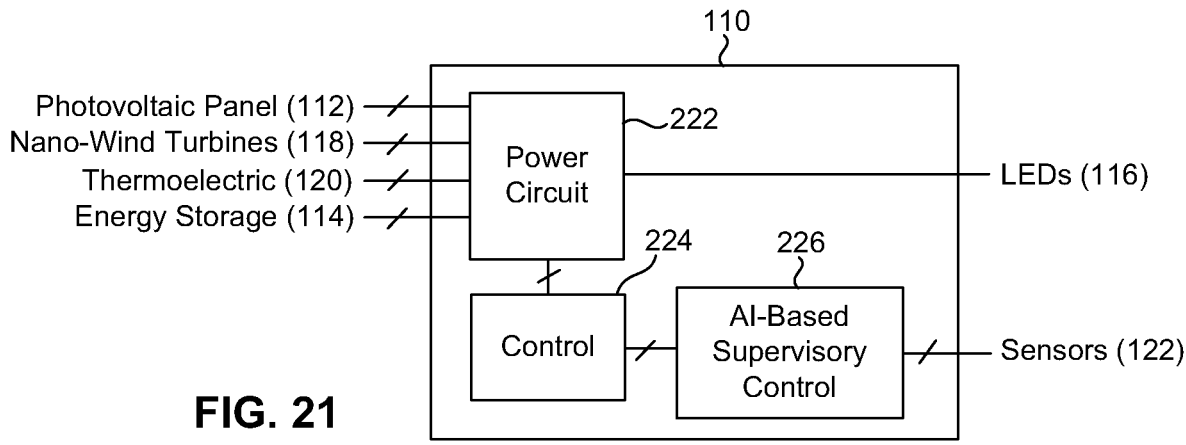
FIG. 21 is a block diagram showing the functional structure of the lighting apparatus shown in FIG. 3 using an artificial-intelligence (AI) supervisory control, according to some embodiments of this disclosure.

In some embodiments as shown in FIG. 21, the electronic circuitry 110 comprises a power circuit 222 electrically coupled or connected to the PV panels 112, the nano-wind turbines 118, the TEGs 120, the energy storage units 114, and the LEDs 116. The electronic circuitry 110 also comprises a control unit 224 electrically coupled or connected to the power circuit 222 for the electrical control thereof. In these embodiments, the electronic circuitry 110 further comprises an artificial-intelligence (AI) based supervisory control unit 226 electrically coupled or connected to the control unit 224. The AI-based supervisory control unit 226 receives the outputs of the sensors 122 and controlling the operation of the components 112 to 120 via the control unit 224.

In these embodiments, the AI-based supervisory control unit 226 comprises one or more AI models trained using historical outputs of the sensors 122 (representing historical data of, for example, traffic, weather condition, and/or the like) and historical operation data of various components of the lighting apparatus 100 such as the historical operation data of the LEDs 116, the PV panels 112, the nano-wind turbines 118, the TEGs 120, and/or the energy storage units 114. The AI-based supervisory control unit 226 uses the one or more trained AI models to intelligently predict operation conditions of the lighting apparatus 100 based on the outputs of the sensors 122 and adjust the operation of various components of the lighting apparatus 100 for optimizing the performance thereof with increased reliability. For example, the AI-based supervisory control unit 226 uses the one or more trained AI models to estimate or predict the amount of available energy and control the light intensity of the LEDs 116 through controlling the LED currents (via the control unit 224) for achieving high-level reliability. As another example, motion sensors may be used to turn on and off the LEDs 116 based on the output of one or more light sensors or based on the AI prediction using the output of the one or more motion sensors, together with the output of one or more temperature sensors, one or more humidity sensors, one or more light sensors, and/or the like.

In some embodiments, the one or more AI models may also be trained by using historical data of, for example, traffic, weather condition, and/or the like obtained by other devices.

In some embodiments, the lighting apparatus 100 may comprise a communication component for receiving relevant data such as traffic, weather condition, and/or the like from other devices or one or more computer servers. The AI-based supervisory control unit 226 may use the one or more trained AI models to intelligently predict operation conditions of the lighting apparatus 100 based on the outputs of the sensors 122 and the data received through the communication component. The AI-based supervisory control unit 226 then adjust the operation of various components of the lighting apparatus 100 based on the predicted operation conditions for optimizing the performance thereof with increased reliability.

Figure 22:
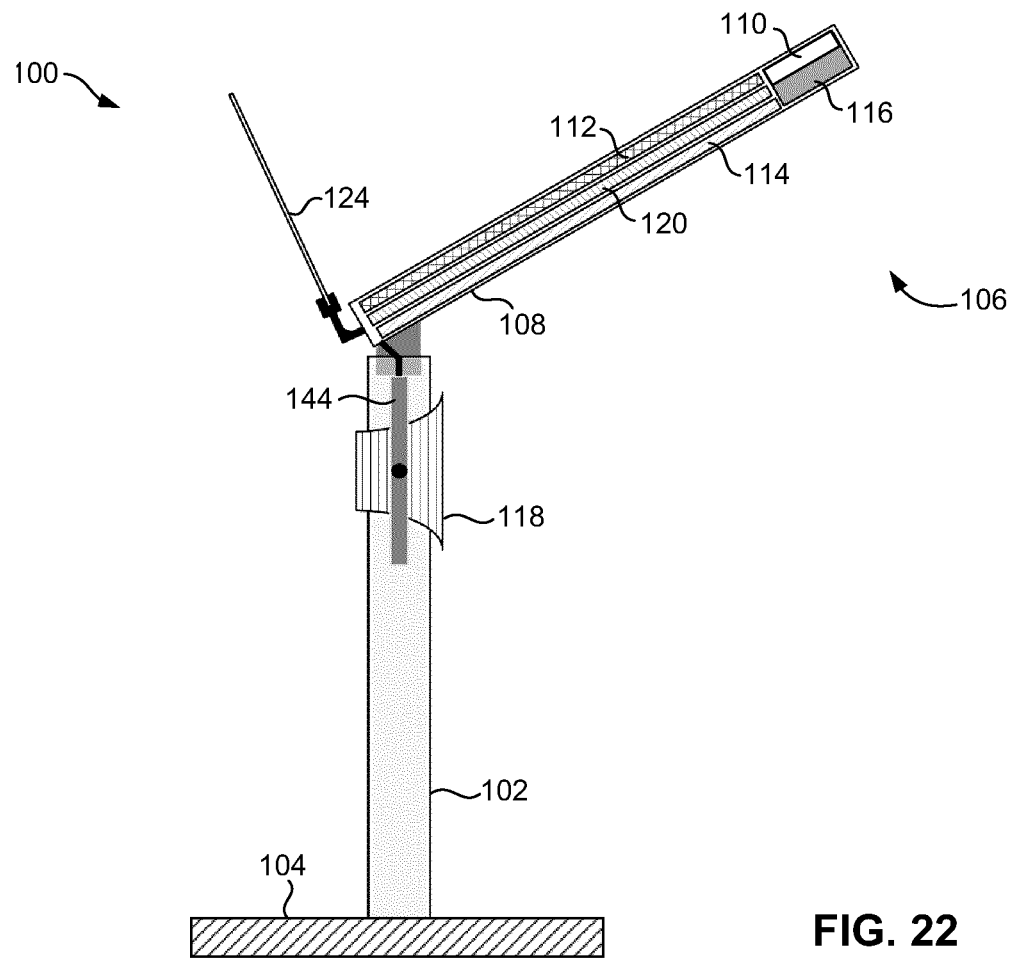
FIG. 22 is a schematic cross-sectional view of a lighting apparatus, according to some embodiments of this disclosure.
Figure 23:
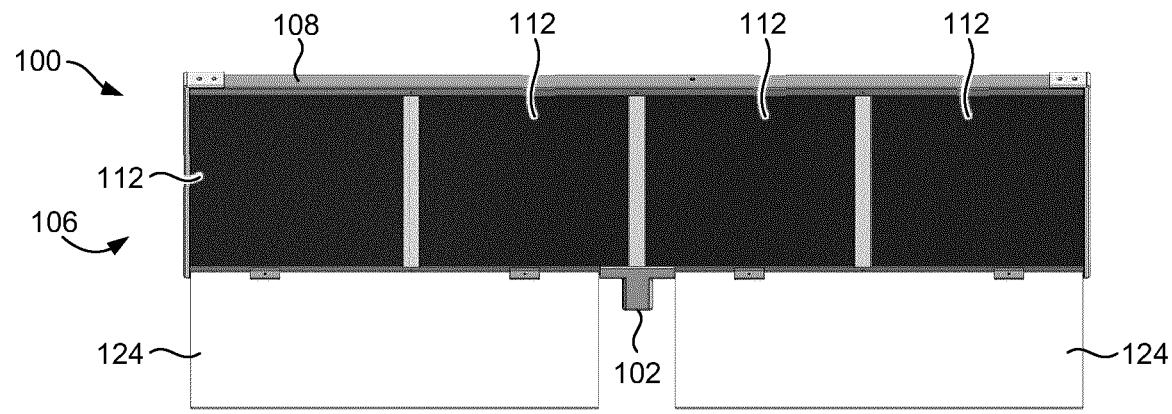
FIG. 23 is a schematic plan view of the lighting apparatus shown in FIG. 22.

FIGS. 22 and 23 show a lighting apparatus 100 according to some embodiments of this disclosure, wherein FIG. 22 is a schematic cross-sectional view of the lighting apparatus 100 and FIG. 23 is a schematic plan view thereof.

The lighting apparatus 100 in these embodiments is similar to that shown in FIGS. 3 to 5. However, in these embodiments, both the energy-storage unit 114 and the TEG 120 leverage the large area of the PV panel 112 and extend along the rear side of the PV panel 112 without wrapping. Moreover, the TEG 120 is sandwiched between the PV panel 112 and the energy-storage unit 114.

Figure 24:
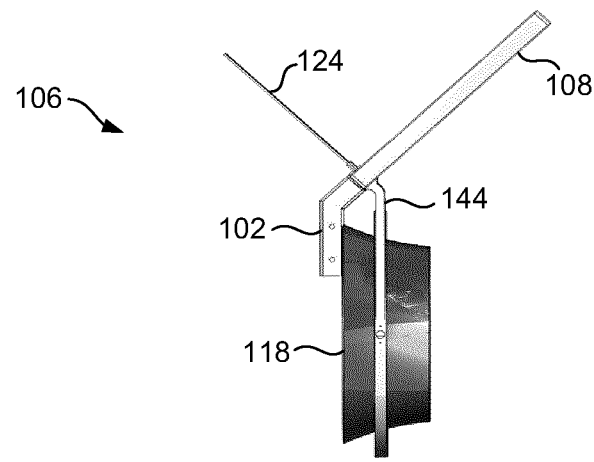
FIG. 24 is a schematic side view of a lighting assembly of the lighting apparatus shown in FIG. 22.
Figure 25:
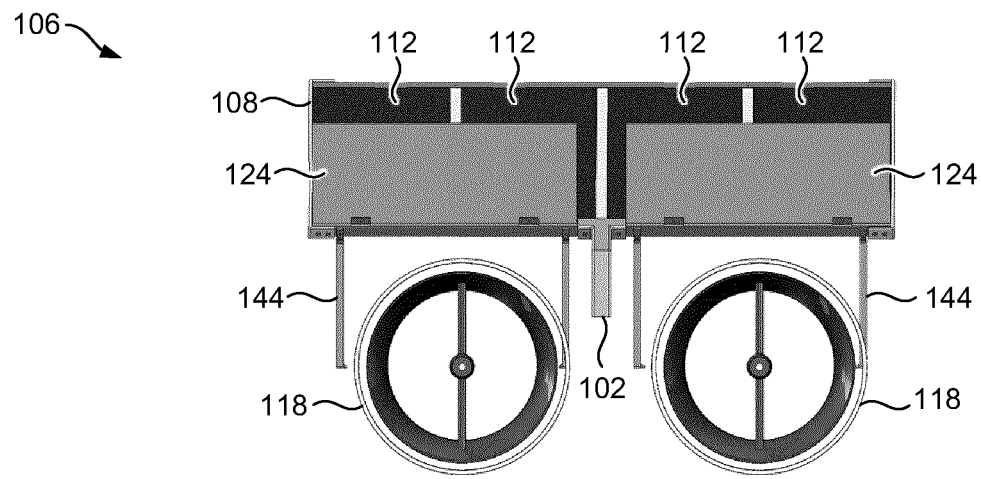
FIG. 25 is a schematic rear view of the lighting assembly shown in FIG. 24.
Figure 26:
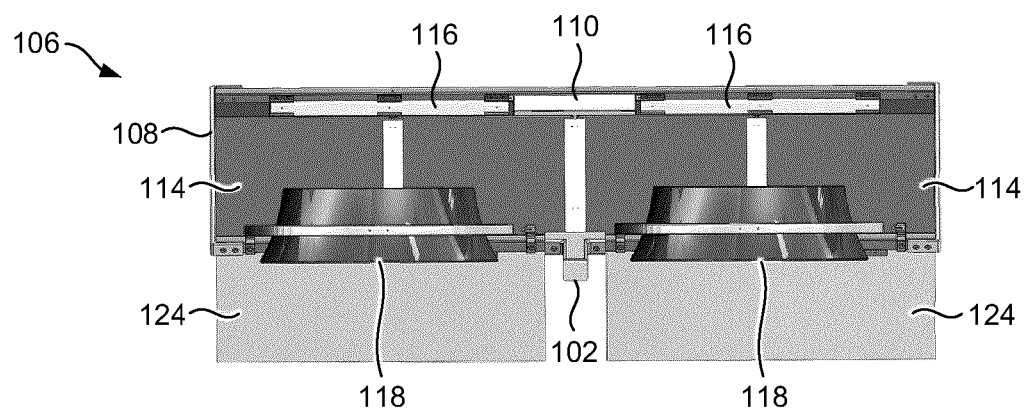
FIG. 26 is a schematic bottom view of the lighting assembly shown in FIG. 24.
Figure 27:
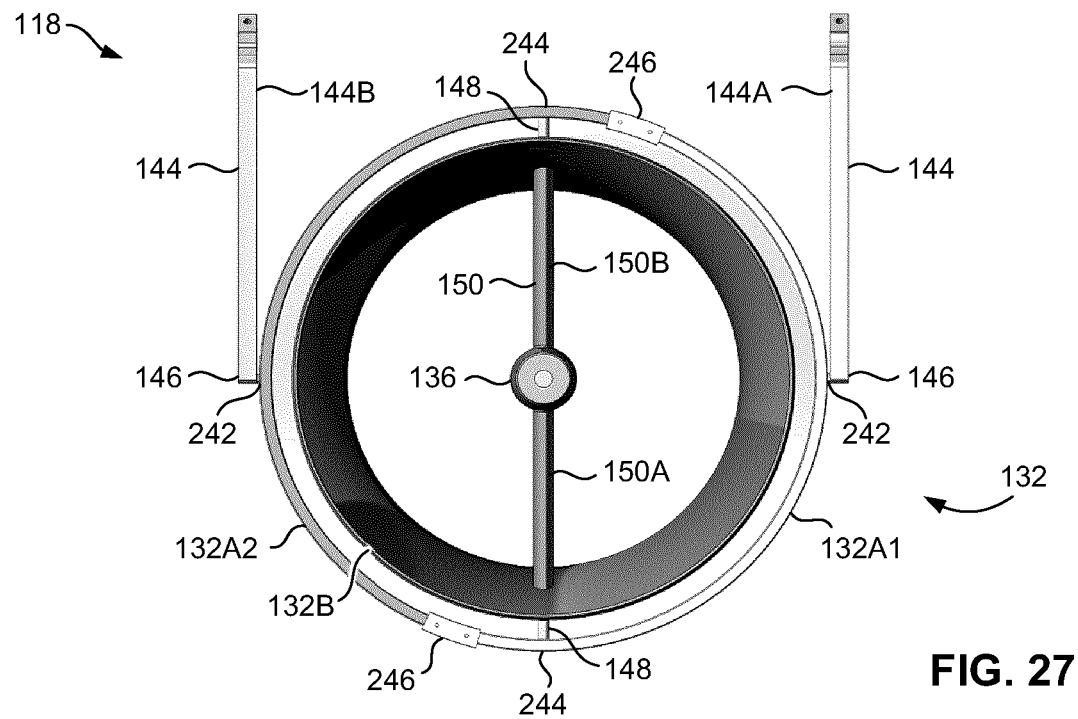
FIG. 27 is a schematic front view of a wind turbine of the lighting assembly shown in FIG. 24.
Figure 28:
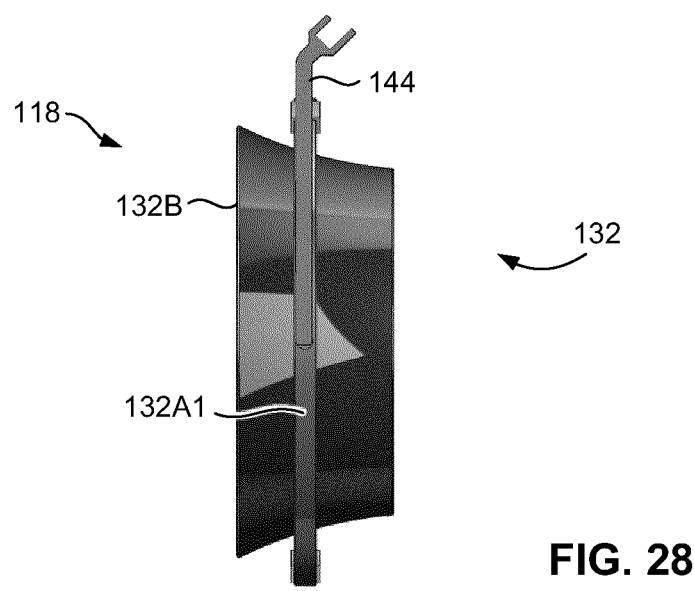
FIG. 28 is a schematic side view of the wind turbine shown in FIG. 27.
Figure 29:
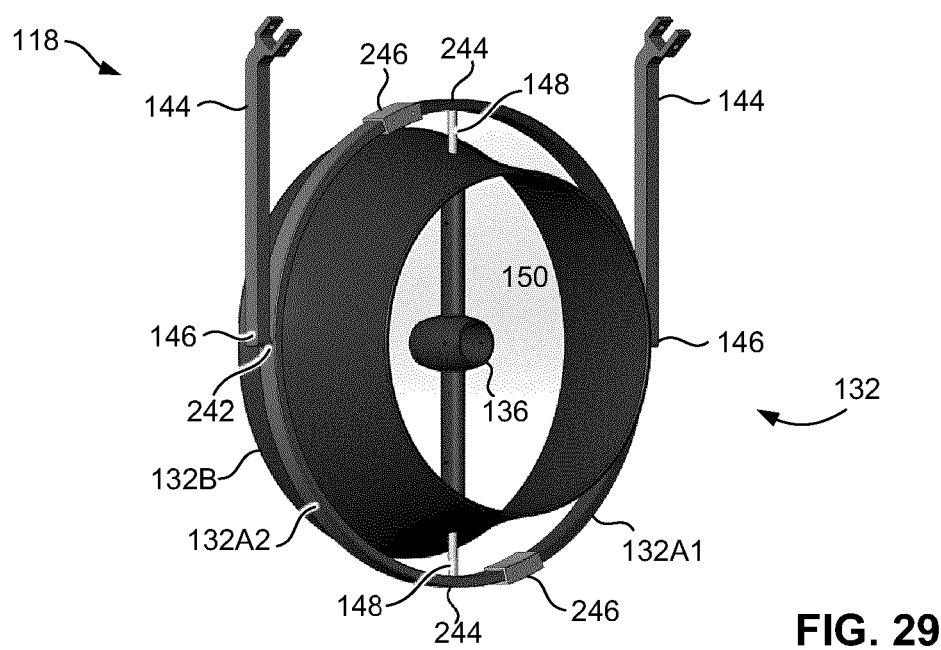
FIG. 29 is a schematic perspective view of the wind turbine shown in FIG. 27.

In these embodiments, the one or more wind turbines 118 of the lighting apparatus 100 are not received in the housing 108 of the lighting assembly 106. As shown in FIGS. 24 to 26, the wind turbine 118 is coupled to the housing 108 of the lighting assembly 106 via a support 144. As shown in FIGS. 27 to 29, the wind turbine 118 comprises a gyroscopic structure 132 formed by a rotatable outer frame 132A and a rotatable inner frame 132B both in suitable shapes such as circular shapes. The outer frame 132A is rotatably mounted or otherwise coupled to the support 144 via ball bearings 242 for rotating about a first axis 146. The inner frame 132B is rotatably mounted or otherwise coupled to the outer frame 132A via ball bearings 244 for rotating about a second axis 148 substantially perpendicular to the first axis 146.

The blades (not shown) are rotatably coupled to the inner frame 132B via a coupling structure 150. A generator 136 is coupled to the blades such that the rotation of the blades drives the generator 136 to convert wind energy to electrical energy.

In these embodiments, the outer frame 132A comprises or otherwise formed by a plurality of electrically conductive portions separated by a plurality of electrical isolators 246 (such as two electrically conductive portions 132A1 and 132A2 shown in FIG. 27 separated by a pair of electrical isolators 246). A coupling structure 150 supporting the generator 136 is coupled to and extends between the a plurality of conductive portions 132A1 and 132A2. Each of the conductive portions 132A1 and 132A2 is electrically connected to the generator 136 via a suitable electrical wiring of the coupling structure 150. Each of the conductive portions 132A1 and 132A2 is also electrically connected to a respective wiring of the support 144. Thus, the conductive portions 132A1 and 132A2 acts as electrodes for outputting electricity from the generator 136 through the wirings of the supports 144 (for example, to the energy-storage units 114 and/or the LEDs 116).

In some embodiments the coupling structure 150 may comprise a plurality of electrically conductive arms (such as two electrically conductive arms 150A and 150B shown in FIG. 27) each acting as an electrical wiring for electrically connecting a respective conductive portions 132A1 or 132A2 to the generator 136.

In some embodiments the support 144 may comprise a plurality of electrically conductive arms 144A and 144B each physically and electrically coupled to a respective conductive portions 132A1 or 132A2, and acting as an electrical wiring for outputting electricity from the generator 136.

In these embodiments, the inner frame 132B has a substantially conical shape for acting as a wind diffuser, which may increase the velocity of the wind passing through the blades in the inner frame 132B. Therefore, the wind turbine 118 may start operation at lower ambient wind speeds and with increased efficiency of power conversion.

Figure 30:
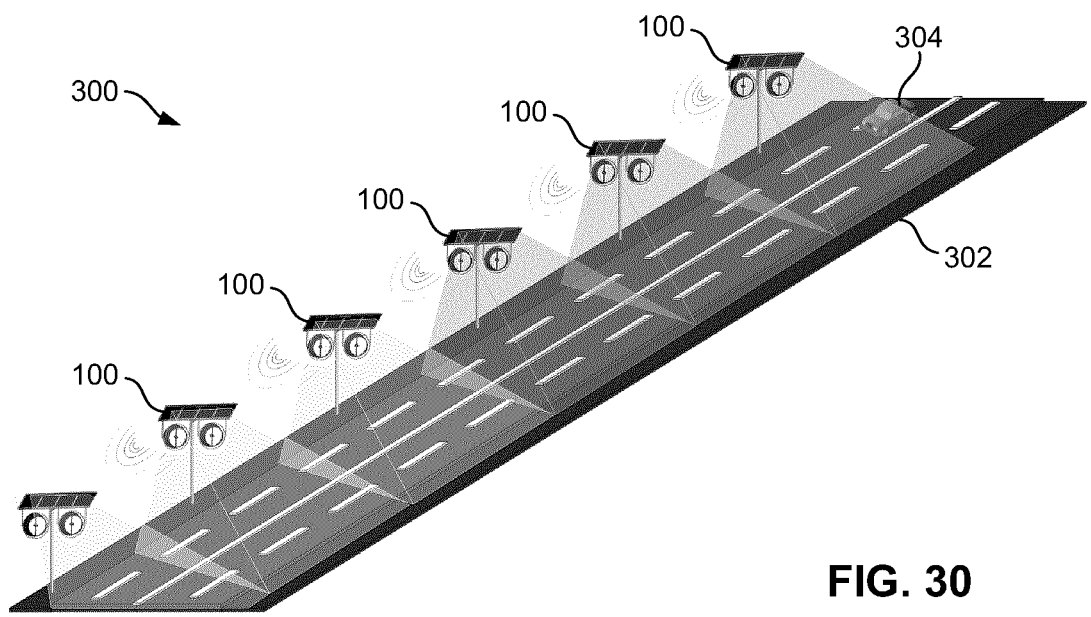
FIG. 30 is a schematic diagram showing a lighting system having a plurality of lighting apparatuses deployed in a site, according some embodiments of this disclosure.

FIG. 30 shows a lighting system 300 according to some embodiments of this disclosure. In these embodiments, the lighting system 300 comprises a plurality of lighting apparatuses 100 deployed in a site 302 (FIG. 30 shows along a road as an example). Each of the lighting apparatuses 100 may be that shown in FIGS. 3 to 5 or that shown in FIGS. 22 to 23, and further comprises a communication component (not shown) for communication with other lighting apparatuses via suitable wired or wireless means.

With the communication among the lighting apparatuses 100, the lighting system 300 may use the sensors 122 of the lighting apparatuses 100 to sense the site 302 and objects therein, and coordinate the operation of the lighting apparatuses 100. For example, the lighting apparatuses 100 may change their light intensities based on the motions of objects in the site 302. For example, to enhance the reliability, the sensors 122 of a lighting apparatus 100 may detect object movements and inform adjacent lighting apparatus about the presence of the object to adjust their light intensities accordingly. In some embodiments, the lighting system 300 may estimate the pace of the object and adjust the light intensities of the lighting apparatuses 100 accordingly. Therefore, the lighting system 300 may more reliability with reduced energy consumption.

Figure 31:
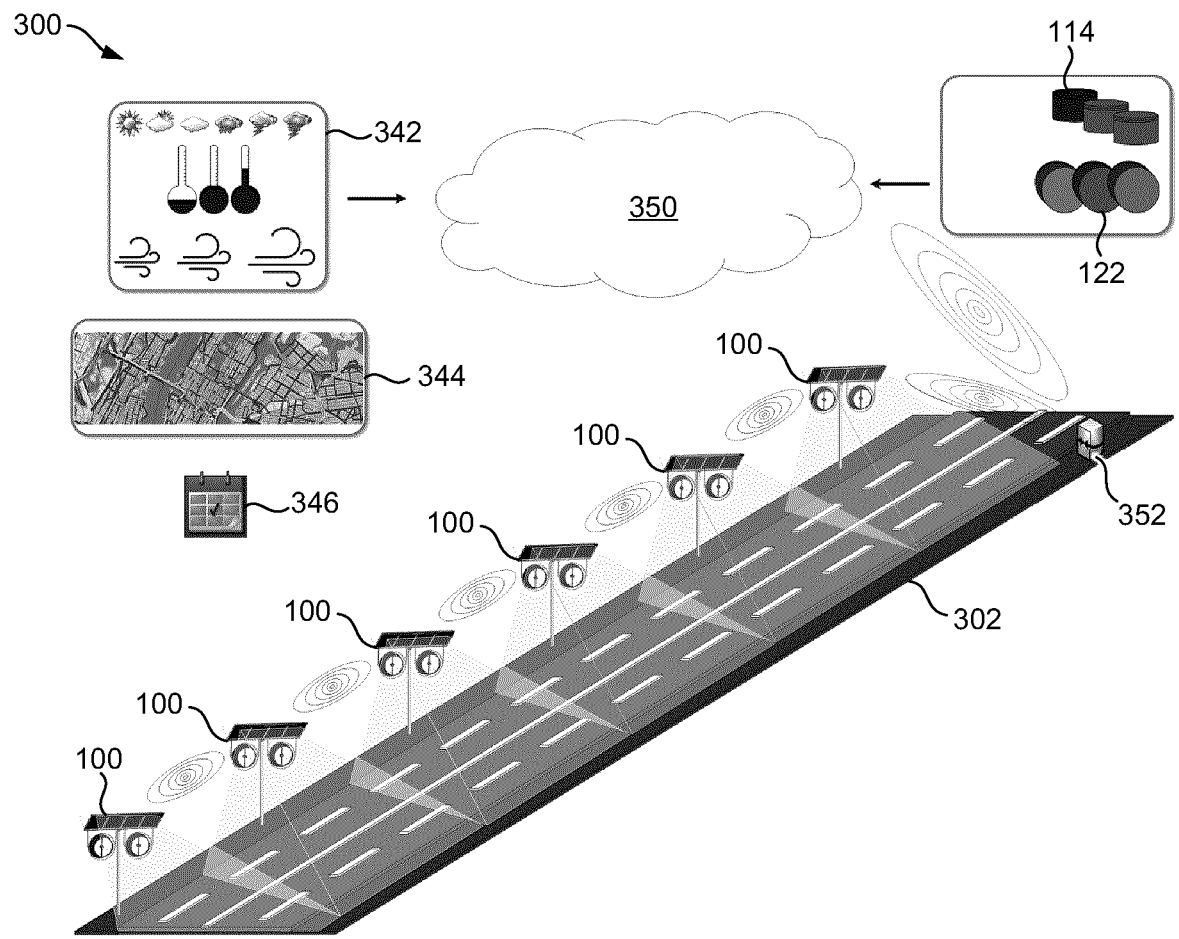
FIG. 31 is a schematic diagram showing a lighting system having a plurality of lighting apparatuses deployed in a site and using one or more artificial intelligence (AI) models for predicting operation of the lighting apparatuses, according some embodiments of this disclosure.

In some embodiments as shown in FIG. 31, the lighting system 300 may collect information from a plurality of sources such as the energy storage units 114 (such as the states thereof), the sensors 122, the weather information 342, the map 344 of the site 302, the traffic of the site 302, date and time 346, and/or the like, and use one or more AI models 350 to predict the change of the environment of the site 302 (such as changes of the weather, ambient light intensity, daytime/nighttime, object movements (for example, pace and direction thereof), and/or the like), and adjust the operation (such as light intensities) of the lighting apparatuses 100 accordingly. In these embodiments, one or more communication gateways 352 may be used for facilitating the communication between lighting apparatuses 100.

Although embodiments have been described above with reference to the accompanying drawings, those of skill in the art will appreciate that variations and modifications may be made without departing from the scope thereof as defined by the appended claims.

What is claimed is:

1. A lighting apparatus comprising:
a lighting component;
an energy storage unit;
a photovoltaic (PV) panel for at least one of powering the lighting component and charging the energy storage unit;
a wind turbine having a plurality of rotatable blades coupled to a generator for at least one of powering the lighting component and charging the energy storage unit; and
a housing receiving therein at least the lighting component, the energy storage unit, and the PV panel,
wherein the wind turbine is physically coupled to the housing; and
a reflector coupled to the housing for reflecting light towards the PV panel.

2. The lighting apparatus of claim 1, wherein the wind turbine comprises a gyroscopic structure; and wherein the plurality of rotatable blades are coupled to the gyroscopic structure for aligning a direction of the plurality of rotatable blades along a wind direction.

3. The lighting apparatus of claim 2, wherein the gyroscopic structure comprises:
an outer frame coupled to a support and rotatable about a first axis; and
an inner frame coupled to the outer frame and rotatable about a second axis perpendicular to the first axis;
wherein the plurality of rotatable blades are coupled to the inner frame.

4. The lighting apparatus of claim 3, wherein the inner frame comprises a wind diffuser structure receiving therein the plurality of rotatable blades.

5. The lighting apparatus of claim 4, wherein the wind diffuser structure has a conical shape.

6. The lighting apparatus of claim 3, wherein the gyroscopic structure comprises:
a coupling structure supporting the generator;
wherein the outer frame comprises a plurality of electrically conductive portions separated by a plurality of electrical isolators;
wherein the coupling structure is coupled to and extends between the plurality of conductive portions; and
wherein each of the conductive portions is electrically connected to the generator via a first electrical wiring of the coupling structure for receiving electricity from the generator, and is also electrically connected to a second electrical wiring of the support for outputting the electricity received from the generator.

7. The lighting apparatus of claim 6, wherein the coupling structure comprises a plurality of electrically conductive first arms for acting as the first electrical wirings; and wherein the support comprises a plurality of electrically conductive second arms for acting as the second electrical wirings.

8. The lighting apparatus of claim 2, wherein the gyroscopic structure comprises an aligning tail for tracking the wind direction.

9. The lighting apparatus of claim 1, wherein the energy storage unit comprises an energy-storage capacitor.

10. The lighting apparatus of claim 9, wherein the energy-storage capacitor comprises at least one capacitor cell.

11. The lighting apparatus of claim 9, wherein the energy-storage capacitor comprises a plurality of stacked capacitor cells.

12. The lighting apparatus of claim 10, wherein each of the at least one capacitor cell comprises a plurality of stacked layers of:
a dielectric membrane; and
two conductive layers of two-dimensional (2D) or three-dimensional (3D) materials sandwiching the dielectric membrane, wherein the 2D or 3D materials comprise graphene and/or graphite;
wherein the plurality of stacked layers extend along a rear side of the PV panel without wrapping.

13. The lighting apparatus of claim 1 further comprising:
a thermoelectric unit received in the housing, the thermoelectric unit coupled to the lighting component or the PV panel for converting heat emitted therefrom to electricity for at least one of powering the lighting component and charging the energy storage unit.

14. The lighting apparatus of claim 13, wherein the thermoelectric unit comprises:
a first thermal-conductive plate coupled to the lighting component or the PV panel;
a second thermal-conductive plate; and
a thermoelectric layer sandwiched between the first and second thermal-conductive plates,
wherein the thermoelectric layer comprises a plurality of thermoelectric sublayers extending between the first and second thermal-conductive plates, each adjacent pair of thermoelectric sublayers sandwiching therebetween a membrane.

15. The lighting apparatus of claim 14, wherein the plurality of thermoelectric sublayers comprise 2D perovskite.

16. The lighting apparatus of claim 1 further comprising one or more sensors, wherein the one or more sensors comprises one or more light sensors, one or more temperature sensors, one or more humidity sensors, one or more motion sensors, or a combination thereof.

17. The lighting apparatus of claim 16 further comprising:
a power circuit electrically coupled to the lighting component, the energy storage unit, the PV panel, the wind turbine, and the one or more sensors; and
a supervisory control module electrically coupled to the power circuit for adjusting operation of the lighting apparatus based on output of the one or more sensors.

18. The lighting apparatus of claim 17, wherein the supervisory control module comprises one or more artificial intelligence (AI) models for predicting operation conditions of the lighting apparatus based on the output of the one or more sensors for adjusting the operation of the lighting apparatus.

19. A lighting system comprising a plurality of lighting apparatuses of claim 16;
   wherein each of the plurality of lighting apparatuses further comprises a communication component; and
   wherein the lighting system is configured for coordinating the operation of the plurality of lighting apparatuses based on the output of the one or more sensors of the plurality of lighting apparatuses.

20. The lighting system of claim 18, wherein the lighting system is configured for:
   predicting the operation conditions of the plurality of lighting apparatuses using the one or more AI models based on the output of the one or more sensors of the plurality of lighting apparatuses; and
   coordinating the operation of the plurality of lighting apparatuses based on the predicted operation conditions of the plurality of lighting apparatuses.

* * * * *